United States Patent
Sarkas et al.

(10) Patent No.: US 12,557,159 B2
(45) Date of Patent: Feb. 17, 2026

(54) ENHANCED BANDWIDTH WIRELESS COMMUNICATION SYSTEM

(71) Applicant: Apple Inc., Cupertino, CA (US)

(72) Inventors: Ioannis Sarkas, Redwood City, CA (US); Sharad Sambhwani, San Diego, CA (US)

(73) Assignee: Apple Inc., Cupertino, CA (US)

( * ) Notice: Subject to any disclaimer, the term of this patent is extended or adjusted under 35 U.S.C. 154(b) by 339 days.

(21) Appl. No.: 18/101,947

(22) Filed: Jan. 26, 2023

(65) Prior Publication Data

US 2024/0090052 A1    Mar. 14, 2024

Related U.S. Application Data

(60) Provisional application No. 63/406,425, filed on Sep. 14, 2022.

(51) Int. Cl.
*H04W 76/15* (2018.01)
*H04W 72/0446* (2023.01)
*H04W 72/0453* (2023.01)

(52) U.S. Cl.
CPC ....... *H04W 76/15* (2018.02); *H04W 72/0446* (2013.01); *H04W 72/0453* (2013.01)

(58) Field of Classification Search
CPC ............. H04W 76/15; H04W 72/0446; H04W 72/0453; H04W 88/06
See application file for complete search history.

(56) References Cited

U.S. PATENT DOCUMENTS

| | | | |
|---|---|---|---|
| 2018/0066981 A1* | 3/2018 | Mukai | H10F 30/10 |
| 2018/0136397 A1* | 5/2018 | Park | G02B 6/10 |
| 2019/0017931 A1* | 1/2019 | Sertel | H04L 25/0276 |
| 2021/0194551 A1* | 6/2021 | Raghavan | H04B 7/0665 |
| 2021/0376461 A1 | 12/2021 | Dallal et al. | |
| 2022/0077998 A1* | 3/2022 | Raghavan | H04W 72/23 |
| 2022/0078717 A1* | 3/2022 | Raghavan | H04W 52/242 |
| 2022/0166596 A1* | 5/2022 | Raghavan | H04W 72/0453 |
| 2022/0200750 A1 | 6/2022 | Sagazio et al. | |

OTHER PUBLICATIONS

Li et al, "D-Band mm-Wave SSB Vector Signal Generation Based on Cascaded Intensity Modulators," IEEE Photonics Journal, vol. 12, No. 2, Apr. 2020, 12 pages.

* cited by examiner

*Primary Examiner* — Brian D Nguyen
(74) *Attorney, Agent, or Firm* — FLETCHER YODER PC

(57) ABSTRACT

Systems and methods described herein may enable an electronic device to communicate using both a first communication system based on a first frequency spectrum (e.g., New Radio (NR)/Fifth Generation (5G) network frequencies) and a second communication system based on a second frequency spectrum (e.g., sub-terahertz (sub-THz) frequencies, Sixth Generation (6G) network frequencies)). The two communication systems may share some front-end processing circuitry, which may help with reducing complexity and footprints of sub-THz communication systems.

20 Claims, 12 Drawing Sheets

ENHANCED BANDWIDTH WIRELESS COMMUNICATION SYSTEM

CROSS-REFERENCE TO RELATED APPLICATIONS

This application claims priority to U.S. Provisional Application No. 63/406,425, filed Sep. 14, 2022, entitled "Enhanced Bandwidth Wireless Communication System," the disclosure of which is incorporated by reference herein in its entirety for all purposes.

BACKGROUND

The present disclosure relates generally to wireless communication, and more specifically to enhanced data communication bandwidths between wireless communication devices.

In an electronic device, a transmitter and a receiver may each be coupled to one or more antennas to enable the electronic device to both transmit and receive wireless signals. These wireless signals are transmitted according to frequency bands assigned by a network operator. Currently, 5$^{th}$ Generation (5G)/New Radio (NR) and earlier technologies are deployed. It may be desired to increase bandwidths to meet increasing demand of relatively high data consumption applications, such as virtual reality applications, augmented reality applications, machine learning applications, and the like. However, some systems deployed in the current 5G spectrum (e.g., Frequency Range 1 (FR1) and Frequency Range 2 (FR2)) may not be universally applicable in other spectrums used to accommodate the higher bandwidth requirements.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device may include a first front end circuit that uses a first frequency spectrum and a first antenna panel coupled to the first front end circuit. The system may include a second front end circuit that uses a second frequency spectrum higher than the first frequency spectrum, the second front end circuit being coupled to the first front end circuit. The system may include a second antenna panel coupled to the second front end circuit.

In some cases, the second front end circuit may communicate on the second frequency spectrum higher than the first frequency spectrum based on a local oscillator signal and an intermediate frequency signal received from the first front end circuit. The local oscillator signal and the intermediate frequency signal may be characterized by different frequency values both within the first frequency spectrum.

In some cases, the second front end circuit includes an amplifier, a mixer, and a modulator. In some cases, the second front end circuit and the first front end circuit operate based on a signal received via a flex cable. In some cases, the second front end circuit and the first front end circuit are configured to operate based on non-simultaneous communication time slots.

In some cases, the second frequency spectrum corresponds to frequencies between 130 gigahertz (GHz) and 150 GHz and the first frequency spectrum corresponds to frequencies between 24 GHz and 48 GHz (e.g., between 27 GHz and 40 GHz).

In another embodiment, a radio frequency communication system includes a first integrated circuit associated with a first frequency spectrum and includes an antenna. The radio frequency communication system may include a second integrated circuit associated with a second frequency spectrum, the second integrated circuit being coupled to the antenna. The second integrated circuit may perform operations that include receiving a local oscillator signal characterized by a first frequency in the first frequency spectrum. The operations may include receiving an intermediate frequency signal characterized by a second frequency in the first frequency spectrum. The operations may include generating a carrier signal based on the local oscillator signal for transmission via the antenna, the carrier signal being characterized by a third frequency in the second frequency spectrum. In some cases, the first frequency and the second frequency may be characterized by different frequency values between 24 gigahertz (GHz) and 48 GHz (e.g., between 27 GHz and 40 GHz). In some cases, the first integrated circuit includes a first plurality of drivers, the second integrated circuit includes a second plurality of drivers, and the intermediate frequency signal and the local oscillator signal are transmitted to the second integrated circuit by the first integrated circuit via the first plurality of drivers and the second plurality of drivers. In some cases, wherein the first integrated circuit includes a first bandpass filter, the second integrated circuit includes a second bandpass filter, and the first bandpass filter is coupled to a subset of the first plurality of drivers and the second bandpass filter.

In yet another embodiments, a method may include receiving, via a radio frequency integrated circuit, a local oscillator signal characterized by a first frequency in a first frequency spectrum associated with the first radio access network; receiving, via the radio frequency integrated circuit, an intermediate frequency signal characterized by a second frequency in the first frequency spectrum; generating, via the radio frequency integrated circuit, a carrier signal based on the local oscillator signal for transmission, the carrier signal being characterized by a third frequency in a second frequency spectrum associated with the second radio access network; and outputting, via the radio frequency integrated circuit, the carrier signal to one or more antennas configured to communicate using the second frequency spectrum.

In some cases, the method further includes receiving, via the radio frequency integrated circuit, a slot indication; determining, via the radio frequency integrated circuit, to pause generation operations at a first time based on the slot indication; and determining, via the radio frequency integrated circuit, to resume the generation operations at a second time based on the slot indication. In some cases, the slot indication of the method is associated with a receive operation based on the first frequency spectrum and the second frequency spectrum. In some cases, the slot indication of the method is associated with a receive operation based on communications of the first radio access network and a pause operation based on communications of the second radio access network. In some cases, the slot indication of the method is associated with non-simultaneous communications of the first radio access network and of the second radio access network. In some cases, the method includes generating, via the radio frequency integrated circuit, a frequency modulated carrier waveform based on the local oscillator signal for transmission, the frequency modulated carrier waveform being characterized by a fourth frequency in a second frequency spectrum associated with the second radio access network; and outputting, via the radio frequency integrated circuit, the frequency modulated carrier waveform during a dedicated sensing time after outputting the carrier signal.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
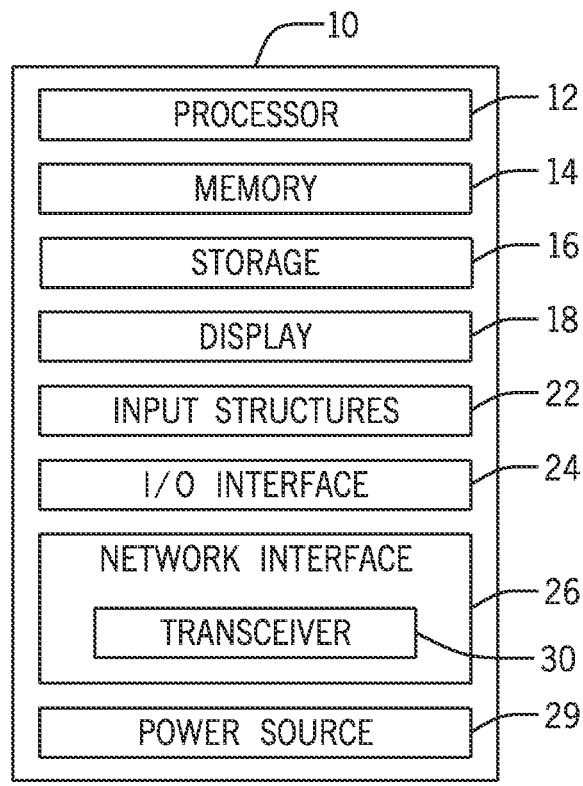
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to hybrid communication systems that use a portion of a radio frequency spectrum of the 5$^{th}$ Generation (5G)/New Radio (NR) specification and a portion of a radio frequency spectrum corresponding to sub-terahertz (THz) spectrums. Current radio frequency (RF) technologies may use a 4$^{th}$ Generation (4G)/Long Term Evolution (LTE) frequency spectrum and/or a 5$^{th}$ Generation (5G)/New Radio (NR) frequency spectrum. However, there is an increasing desire to expand RF technologies into sub-terahertz (THz) spectrums for access to higher bandwidths. Sub-THz spectrums, such as frequencies between 100 GHz and 300 GHz (e.g., between 130-150 GHz), include a potential 6$^{th}$ Generation (6G) band for high-data rate beamformed access, as well as sensing applications. With these evolutions in wireless communications, data rates expected to be used on these various networks may continue to increase relative to data rates used today. Thus, it is becoming increasing desirable to have RF systems able to communicate effectively on the higher bandwidths spectrums with stringent link budgets to meet an increasing demand. The sub-THz spectrums may have a higher frequency relative to typical 5G NR frequencies, and thus may not be natively compatible with using higher frequencies for communications. Thus, systems deployed in the current 5G spectrum (e.g., FR1 and FR2) may not be universally applicable in other spectrums used to accommodate the higher bandwidth requirements. Moreover, signals communicated using the higher frequencies may be unable to be processed by existing radio technologies deployed today without adjustment to processing operations and increasing a frequency compatibility of systems.

With this in mind, systems and methods discussed herein may enable a 5G RF system to use the sub-THz spectrum. These systems and methods discussed herein relate to a heterodyne architecture that converts signals twice. For example, a heterodyne architecture enables a sub-THz signal to be down-converted to an intermediate frequency (IF) (e.g., a frequency less than the sub-THz frequency but greater than a baseband frequency) then the IF signal is down-converted again to a baseband signal before further processing by the 5G RF system. In some cases, the IF may be of suitable value to be able to carry a relatively high bandwidth compatible with the sub-THz network.

Further advantages may be realized if the intermediate frequency (IF) is aligned with one or more frequencies of another communication network, such as frequencies of a FR2 network. The heterodyne architecture described herein may use FR2 frequencies (e.g., between 24 GHz and 48 GHz, between 27 GHz and 40 GHz, between 27 GHz and 29 GHz, between 24.25 GHz and 52.6 GHz, between 27.5 GHz and 28.5 GHz, between 38.5 GHz and 39.5 GHz) as the intermediate frequency for sub-THz along with slot-level coordination with the 5G spectrum. In some cases, a channel raster substantially equal to 140 GHz having a 10 GHz bandwidth may be used.

By using the heterodyne architecture systems and methods described herein, higher data bandwidths may be accessed by existing systems and methods. Indeed, using heterodyne architecture systems that align an intermediate frequency with frequencies of a second communication network when down-converting signals transmitted using a first communication network may more readily enable reuse of previously implemented RF technology. This yields the further advantage of existing silicon circuitry of currently existing electronic devices not having to be completely redesigned and reproduced to access the higher frequencies, which may reduce deployment costs and timeframes associated with utilizing a high bandwidth, sub-THz RF communication system to market. Indeed, existing FR2 silicon may be leveraged, which may reduce an overall complexity of a sub-THz accessing system and/or may make the application of such technology to mobile devices relatively more desirable.

Keeping the foregoing in mind, FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly (e.g., not through or via another component, not via a communication bus, not via a network) or indirectly (e.g., through or via another component, a communication bus, a network) to one another to transmit and/or receive signals between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FIC), and/or a wide area network (WAN), such as any standards related to the Third Generation Partnership Project (3GPP), including, for example, a 3rd generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, a $6^{th}$ generation (6G) or greater than 6G cellular network, a satellite network, a non-terrestrial network, and so on. In particular, the network interface 26 may include, for example, one or more interfaces for using a cellular communication standard of the 5G specifications that include the millimeter wave (mmWave) frequency range (e.g., 24.25-300 gigahertz (GHz)) that defines and/or enables frequency ranges used for wireless communication. The network interface 26 of the electronic device 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
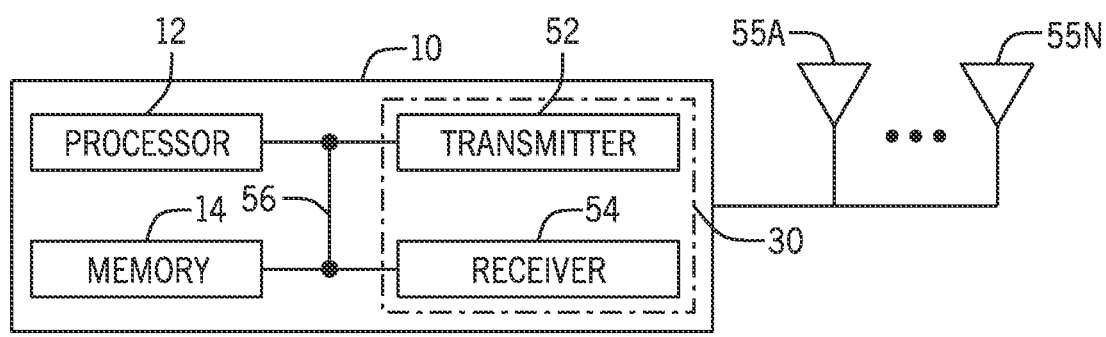
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive signals between one another.

The electronic device 10 may include the transmitter 52 and/or the receiver 54 that respectively enable transmission and reception of signals between the electronic device 10 and an external device via, for example, a network (e.g., including base stations or access points) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N of an antenna group or module may be communicatively coupled to a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
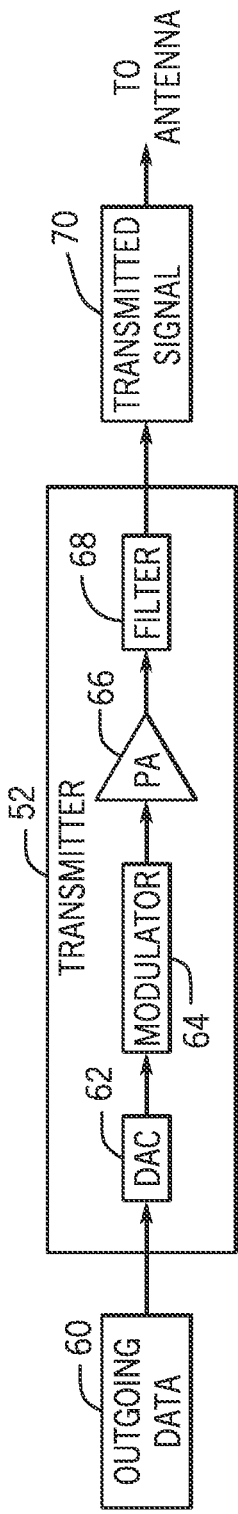
FIG. 3 is a schematic diagram of a transmitter of the electronic device of FIG. 1, according to embodiments of the present disclosure.

FIG. 3 is a schematic diagram of the transmitter 52 (e.g., transmit circuitry), according to embodiments of the present disclosure. As illustrated, the transmitter 52 may receive outgoing data 60 in the form of a digital signal to be transmitted via the one or more antennas 55. A digital-to-analog converter (DAC) 62 of the transmitter 52 may convert the digital signal to an analog signal, and a modulator 64 may combine the converted analog signal with a carrier signal to generate a radio wave. A power amplifier (PA) 66 receives the modulated signal from the modulator 64. The power amplifier 66 may amplify the modulated signal to a suitable level to drive transmission of the signal via the one or more antennas 55. A filter 68 (e.g., filter circuitry and/or software) of the transmitter 52 may then remove undesirable noise from the amplified signal to generate transmitted signal 70 to be transmitted via the one or more antennas 55. The filter 68 may include any suitable filter or filters to remove the undesirable noise from the amplified signal, such as a bandpass filter, a bandstop filter, a low pass filter, a high pass filter, and/or a decimation filter.

The power amplifier 66 and/or the filter 68 may be referred to as part of a radio frequency front end (RFFE) 69, and more specifically, a transmit front end (TXFE) of the electronic device 10. Additionally, the transmitter 52 may include any suitable additional components not shown, or may not include certain of the illustrated components, such that the transmitter 52 may transmit the outgoing data 60 via the one or more antennas 55. For example, the transmitter 52 may include a mixer and/or a digital up converter. As another example, the transmitter 52 may not include the filter 68 if the power amplifier 66 outputs the amplified signal in or approximately in a desired frequency range (such that filtering of the amplified signal may be unnecessary).

Figure 4:
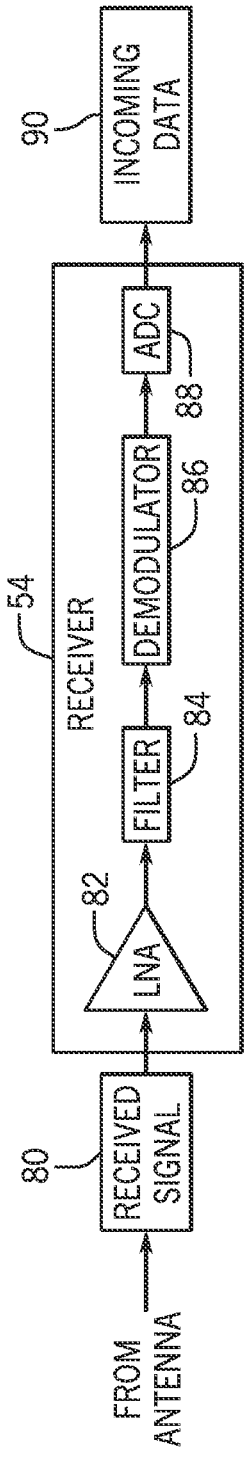
FIG. 4 is a schematic diagram of a receiver of the electronic device of FIG. 1, according to embodiments of the present disclosure.

FIG. 4 is a schematic diagram of the receiver 54 (e.g., receive circuitry), according to embodiments of the present disclosure. As illustrated, the receiver 54 may receive received signal 80 from the one or more antennas 55 in the form of an analog signal. A low noise amplifier (LNA) 82 may amplify the received analog signal to a suitable level for the receiver 54 to process. A filter 84 (e.g., filter circuitry and/or software) may remove undesired noise from the received signal, such as cross-channel interference. The filter 84 may also remove additional signals received by the one or more antennas 55 that are at frequencies other than the desired signal. The filter 84 may include any suitable filter or filters to remove the undesired noise or signals from the received signal, such as a bandpass filter, a bandstop filter, a low pass filter, a high pass filter, and/or a decimation filter. The low noise amplifier 82 and/or the filter 84 may be referred to as part of the RFFE 69, and more specifically, a receiver front end (RXFE) of the electronic device 10.

A demodulator 86 may remove a radio frequency envelope and/or extract a demodulated signal from the filtered signal for processing. An analog-to-digital converter (ADC) 88 may receive the demodulated analog signal and convert the signal to a digital signal of incoming data 90 to be further processed by the electronic device 10. Additionally, the receiver 54 may include any suitable additional components not shown, or may not include certain of the illustrated components, such that the receiver 54 may receive the received signal 80 via the one or more antennas 55. For example, the receiver 54 may include a mixer and/or a digital down converter.

Figure 5:
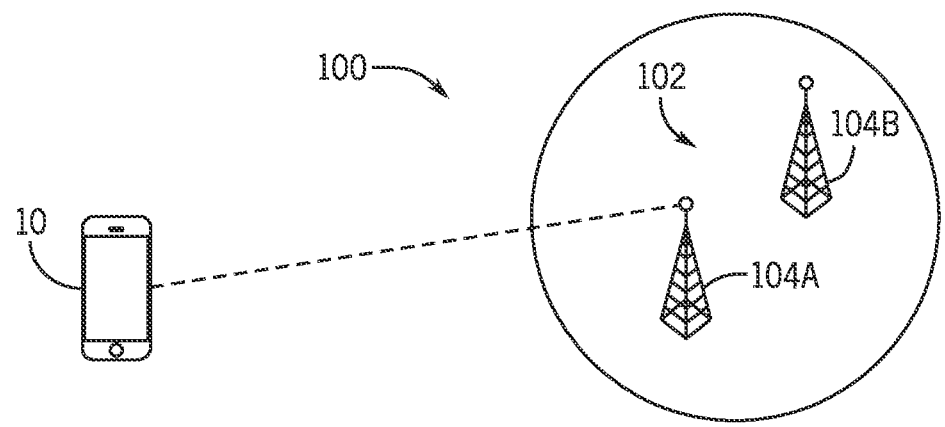
FIG. 5 is a schematic diagram of a communication system including the user equipment of FIG. 1 communicatively coupled to a wireless communication network supported by base stations, according to embodiments of the present disclosure.

FIG. 5 is a schematic diagram of a communication system 100 including the electronic device 10 (e.g., user equipment) of FIG. 1 communicatively coupled to a wireless communication network 102 supported by base stations 104A, 104B (collectively 104), according to embodiments of the present disclosure. In particular, the base stations 104 may include Next Generation NodeB (gNodeB or gNB) base stations and may provide 5G/NR coverage via the wireless communication network 102 to the user equipment 10. The base stations 104 may include any suitable electronic device, such as a communication hub or node, that facilitates, supports, and/or implements the network 102. In some embodiments, the base stations 104 may include Evolved NodeB (eNodeB) base stations and may provide 4G/LTE coverage via the wireless communication network 102 to the user equipment 10. Each of the base stations 104 may include at least some of the components of the electronic device 10 shown in FIGS. 1 and 2, including one or more processors 12, the memory 14, the storage 16, the transceiver 30, the transmitter 52, the receiver 54, and the associated circuitry shown in FIG. 4.

It should be understood that while the present disclosure may use 5G/NR as an example specification or standard, the embodiments disclosed herein may apply to other suitable specifications or standards (e.g., such as the 4G/LTE specification, a 6G specification, a beyond 6G specification, a specification that operates in the sub-THz frequency range, and so on). Moreover, the network 102 may include any suitable number of base stations 104 (e.g., one or more base stations 104, four or more base stations 104, ten or more base stations 104, and so on).

Figure 6:
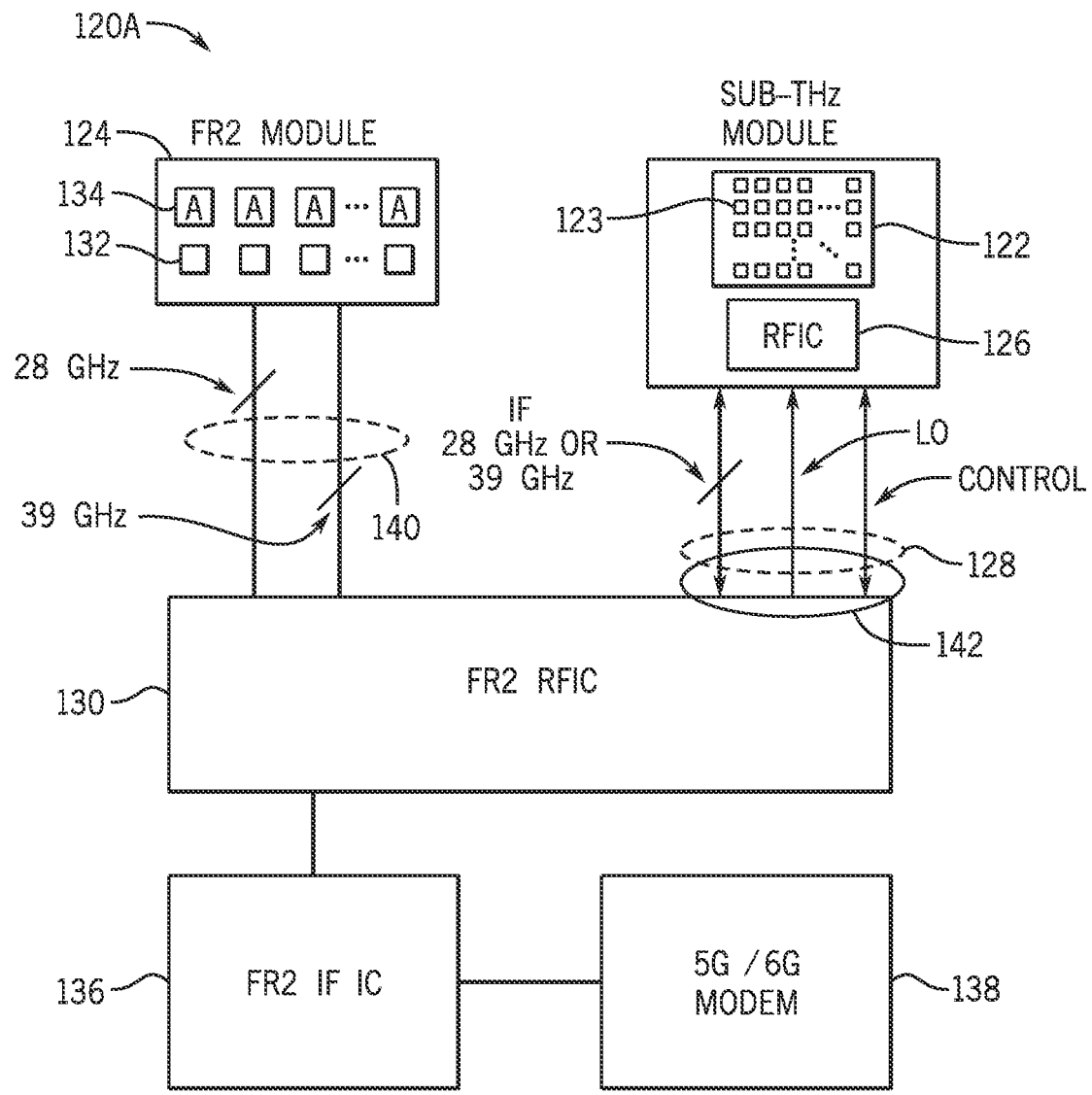
FIG. 6 is a block diagram of a first example communication system of the electronic device of FIG. 1 that implements a heterodyne architecture, according to embodiments of the present disclosure.

Referring now to FIG. 6, FIG. 6 is a block diagram of an example portion of an example electronic device 10, a first example system 120A, that implements a heterodyne architecture discussed above. The system 120A may include any suitable circuitry, for example, a sub-THz antenna panel 122, a FR2 antenna panel 124, a radio frequency integrated circuitry (RFIC) 126, a routing 128, a FR2 RFIC 130, processing circuitry 132, an antenna 134, a FR2 intermediate frequency (IF) integrated circuit (IC) 136, a 5G/6G modulator-demodulator (modem) 138, a routing 140, and interfaces 142. Comparing FIG. 1 and FIG. 6, the first example system 120A may include circuitry included in different portions of the illustrated electronic device 10 of FIG. 1. For example, the antenna panel 122, the FR2 antenna panel 124, and/or the antennas 134 may be included in the antennas 55, the FR2 RFIC 130, the FR2 IF IC 136, and/or the 5G/6G modem 138 may be included in the transceiver(s) 30, and/or the processing circuitry 132 may be included in processor 12. In this way, FIG. 6 may correspond to a portion of the circuitry shown in FIGS. 1-5.

The system 120A corresponds to a sub-THz cellular architecture that combines both a sub-THz antenna panel 122 and a FR2 antenna panel 124. Each antenna panel 122, 124 may include one or more antennas 134 that may form beams for transmitting or receiving radio frequency signals.

The sub-THz antenna panel 122 may be packed in silicon with a corresponding RFIC 126 (e.g., front end circuitry that uses the 6G frequency spectrum), where the RFIC 126 may include processing circuitry that processes signals received via the sub-THz antenna panel 122 before sending the signals via routing 128 as processed signals. The processed signals transmitted via the routing 128 may include digital signals converted from the received radio frequency signals having sub-THz frequencies.

The sub-THz antenna panel 122 may communicate using heterodyne communication operations. Indeed, the sub-THz RFIC 126 may combine signals from the routing 128 to produce radio frequency signals having compatible sub-THz frequencies, which may be wirelessly transmitted to a communication network that uses sub-THz frequencies. The RFIC 126 may include local oscillator circuitry to generate and/or combine local oscillator (LO) signals and radio frequency (RF) signals. The RFIC 126 may receive the LO signals and RF signals via the routing 128 from an FR2 RFIC 130 (e.g., front end circuitry that uses the 5G/NR frequency spectrum). Several LO signals and intermediate frequency (IF) signals combinations may be possible to enable communication via the sub-THz network. In this way, the FR2 IF IC 136 and/or the sub-THz RFIC 126 of the system 120A may include one or more low noise amplifiers, one or more power amplifiers, one or more filters, one or more mixers, or the like, to process the LO signal and IF signal prior to transmission via antennas of the antenna panel 122, as may be discussed later in reference to FIGS. 14-15.

As an example, Equation 1 may illustrate a relationship between a final frequency of a signal transmitted via the sub-THz antenna panel 122 and between frequencies of a LO signal and RF signal received by the RFIC 126 via the routing 128.

$$f_{RF} = C^* f_{LO} + Y^* f_{IF} = 140 \text{ GHz, when } f_{IF} = 27.5 \text{ GHz,}$$
$$f_{LO} = 37.5 \text{ GHz} \quad [1]$$

Equation 1 shows the frequency of a radio frequency signal ($f_{RF}$) as equal to a constant (C) being multiplied by a frequency of a LO signal ($f_{LO}$) and combined with a constant (Y) being multiplied by a frequency of an IF signal ($f_{IF}$). Here, $f_{RF}$ may equal 140 GHz when C equals 3, $f_{LO}$ equals 37.5 GHz, when Y equals 1, and when $f_{IF}$ equals 27.5 GHz. In another example, $f_{RF}$ may equal 140 GHz when C equals 4, $f_{LO}$ equals 25.2 GHz, when Y equals 1, and when $f_{IF}$ equals 39.2 GHz. In yet another example, $f_{RF}$ may equal 122 GHz when C equals 3, $f_{LO}$ equals 27.5 GHz, when Y equals 1, and when $f_{IF}$ equals 39.5 GHz. In another example, $f_{RF}$ may equal 122 GHz when C equals 4, $f_{LO}$ equals 26 GHz, when Y equals 1, and when $f_{IF}$ equals 38.5 GHz. It is noted that any suitable combination of signals may be used. Indeed, frequencies that are harmonically related by a factor of 2 may be used. The relationship represented via Equation 1 may be used to up-convert signals to the sub-THz frequencies used by the antenna panel 122 as well as to down-convert signals received via the antenna panel 122 to FR2 frequency ranges. It is further noted that the processing of the IF signals and LO signals, such as to generate transmittable sub-THz signals based on Equation 1, may be desired to occur in the RFIC 126. This may be due to how transmitting sub-THz signals through routings 128 is generally undesirable since doing so may cause signal decay. Here, directly outputting the generated signals from the RFIC 126 to the antenna panel 122 may involve the RFIC 126 transmitting the signals to an input port of a respective antenna 123 of the antenna panel 122 such that there is no or substantially no delay between output of the signal from the RFIC 126 and a start of the electromagnetic excitations associated with transmitted an electrical signal to an antenna. In this way, an indication of the constant (Y) and/or the constant (C) may be programmed into the RFIC 126 circuitry or may be otherwise read from a memory and applied via processing circuitry of the RFIC 126.

Thus, by using the RF system 120A, communication systems may enable existing FR2 silicon devices to communicate with high frequency networks. Indeed, the FR2 RFIC 130 may use phase locked loops, transmitters, receivers, processing circuitry, or the like, already deployed today in cellular systems, to communicate on newly applied communication spectrums, which may reduce a complexity of integrating 6G into 5G/NR systems while reducing a footprint of 6G systems.

Other systems shown in the system 120A include processing circuitry 132 associated with an antenna 134 of the antenna panel 124. The system 120A also includes a FR2 intermediate frequency (IF) integrated circuit (IC) 136 and a 5G/6G modulator-demodulator (modem) 138. The modem 138 may operate to modulate digital signals into analog signals suitable for transmission via 5G and/or 6G networks.

Routings 140 may transmit signals between the antenna panel 124 and the FR2 RFIC 130. The routings 140 may include multiple transmission pathways or lines (T-line) (e.g., 8 transmission pathways configurable to transmit signals in a first frequency range and 8 transmission pathways configurable to transmit signals in a second frequency range). Each transmission line may include a specialized cable or other structure designed to conduct electromagnetic waves in a contained manner. The transmission pathways may transmit and receive signals having a raster frequency of 28 GHz and/or 39 GHz, and it is noted that any suitable frequency may be used (e.g., a frequency between 26 GHz and 29 GHz, a frequency between 38 GHz and 40 GHz). Some of the transmission pathways may include horizontal (H) pathways or elements to transmit or receive horizontally polarized signals and some of the pathways may include vertical (V) pathways or elements to transmit or receive vertically polarized signals. The routings 128 may include transmission pathways that communicate RF signals with a raster frequency of 28 GHz or 39 GHz. For example, the routings 128 may include one H pathway corresponding to a signal with a raster frequency of 28 GHz or 39 GHz, and one V pathway to carry a signal having a matching frequency as that of the signal on the H pathway. The routings 128 may also include a routing that communicates the LO signal, and another routing that communicates a digital signal. The routings 128 and/or the routings 140 may be any suitable type of signal pathway. For example, the routings 128, 140 may include any combination of coaxial transmission line, wire, antenna, via, or the like. Additional interfaces 142 may be included with the FR2 RFIC 130 to enable communicative coupling to the sub-THz RFIC 126 and antenna panel 122.

Figure 7:
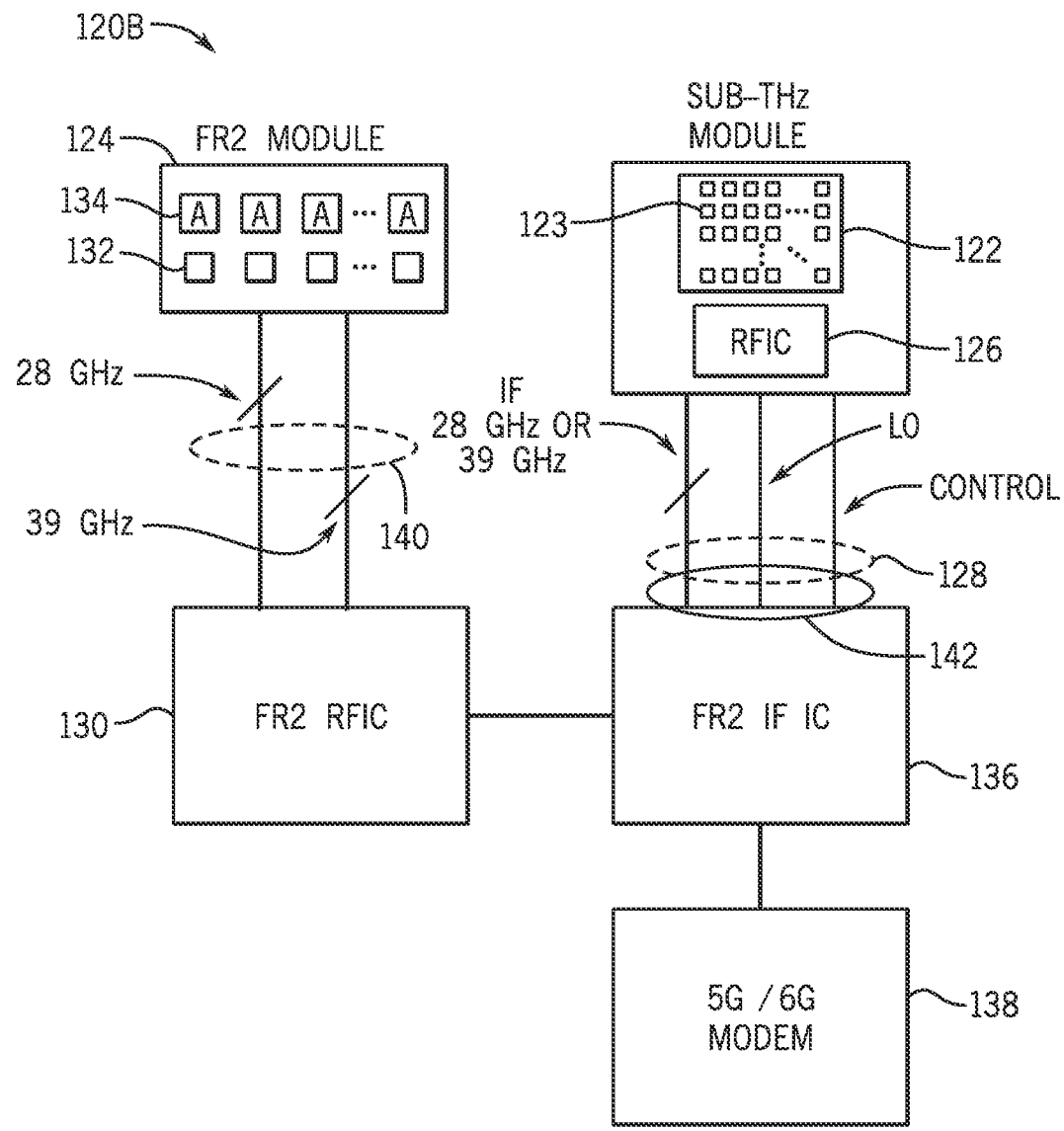
FIG. 7 is a block diagram of a second example communication system of the electronic device of FIG. 1 that implements the heterodyne architecture with direct down conversion operations, according to embodiments of the present disclosure.

Referring now to FIG. 7, FIG. 7 is a block diagram of a second example system 120B that implements the heterodyne architecture discussed above. Descriptions from FIG. 6 are relied on herein for ease of disclosure. For further ease of understanding, FIG. 6 and FIG. 7 are referred to together herein. In FIG. 7, the system 120B is adjusted to enable the sub-THz RFIC 126 to down convert directly to a low-IF or zero-IF signal (e.g., direct down conversion operations), for example, a signal having a frequency between 0 and 10 GHz. This intermediate frequency may be directly provided to the FR2 IF IC 136 via interfaces 142. The FR2 IF IC 136 may perform I-Q down conversion operations to generate in-phase (I) and quadrature (Q) component signals (I-Q signals). In this example system 120B, the FR2 IF IC 136 may provide the LO signal (e.g., an LO reference signal) to the sub-THz RFIC 126, which may include phase-locked loops, frequency multipliers, and other related components to generate a sub-THz LO signal.

In this way, the FR2 IF IC 136 and/or the sub-THz RFIC 126 of the system 120B may include one or more low noise amplifiers, one or more power amplifiers, one or more filters, one or more mixers, or the like, to process the LO signal and IF signal prior to transmission via antennas of the antenna panel 122, as may be discussed later in reference to FIGS. 14-15.

Furthermore, it is noted that in some cases, the FR2 RFIC 130 may directly communicatively couple to the FR2 IF IC 136 and the 5G/6G modem 138, which may be desirable when combining the FR2 RFIC 130 and the FR2 IF IC 136 into a same integrated circuit package. Moreover, when the FR2 RFIC 130 switches to a zero-IF architecture, there may be a digital interface directly between the FR2 RFIC 130 and the 5G/6G modem 138 to aid signal exchange and communications between the circuitry. This is in contrast to how the connections are depicted in FIG. 7, where the FR2 RFIC 130 is directly communicatively coupled to the FR2 IF IC 136 and the FR2 IF IC 136 is directly communicatively coupled to the 5G/6G modem 138.

Figure 8:
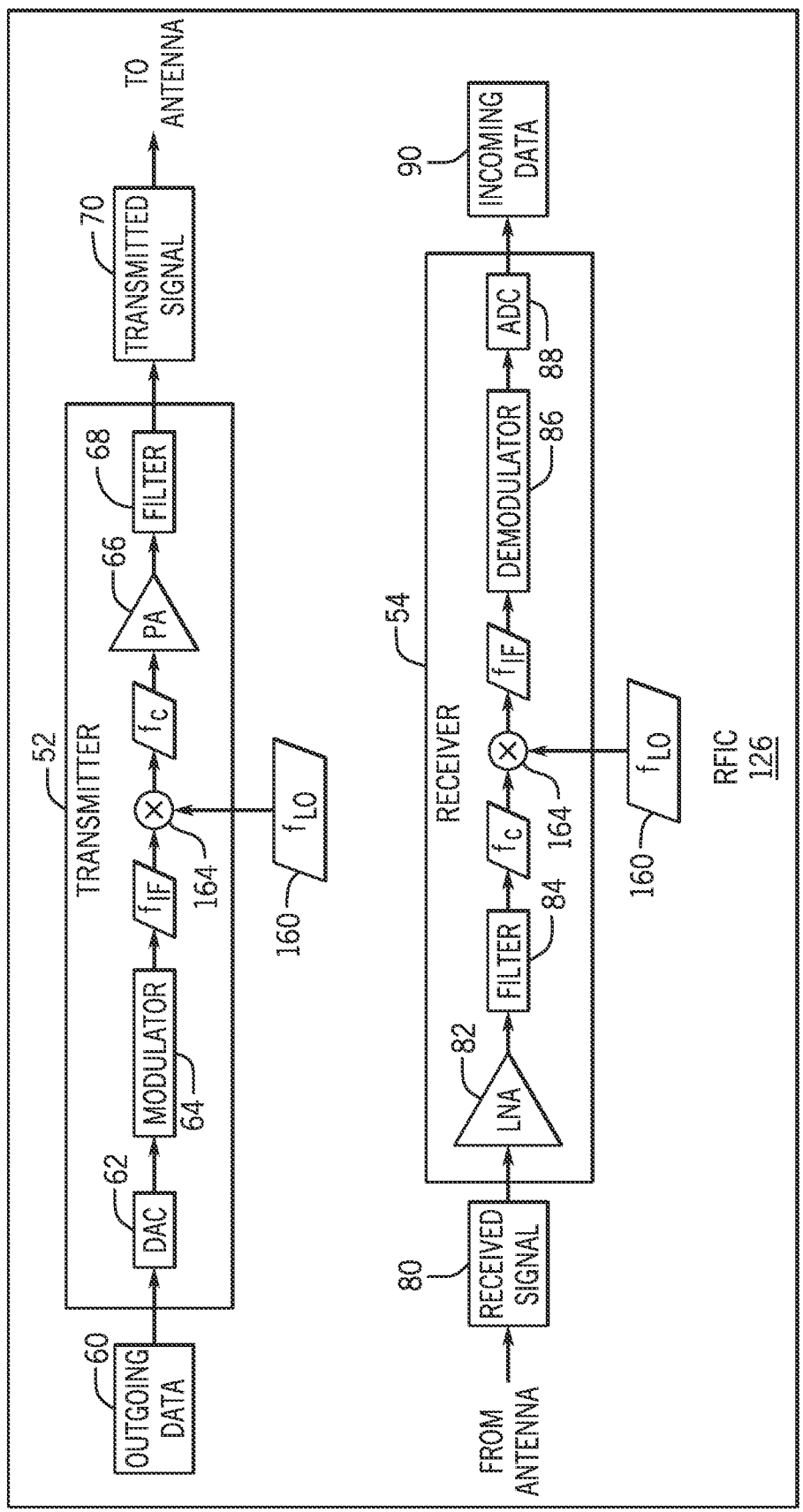
FIG. 8 is a block diagram of an example radio frequency integrated circuitry (RFIC) front end processing circuitry corresponding to the communication systems of FIGS. 6-7, according to embodiments of the present disclosure.

To elaborate briefly on example systems and methods of the FR IF IC 136 of the system 120B and/or the FR2 RFIC 130 of the system 120A, FIG. 8 depicts a schematic block diagram of an embodiment of the transmitter 52 and the receiver 54, as implemented in the RFIC 126 of FIGS. 6-7. It is noted that the various functional blocks shown in FIG. 8 may include hardware elements (including circuitry), software elements (including computer code stored on a computer-readable medium), or a combination of both hardware and software elements (including logic). It should also be noted that FIG. 8 is merely one example of an implementation, and is intended to illustrate the types of components that may be present in the transmitter 52. As such, functional blocks may be added or omitted, and their arrangement within the transmitter 52 may be modified. Furthermore, description made above with reference to FIGS. 3-4 are relied on herein.

In an RF communication system for a transmit operation, an RF signal may be generated, amplified, modulated, and transmitted via an antenna based on operations of the transmitter 52. A local oscillator may generate a signal with a frequency, $f_{LO}$, the LO signal 160. Signals with an intermediate frequency, $f_{IF}$, and the local-oscillation frequency, $f_{LO}$, may be transmitted to a mixer 164. The frequency of the output signal from the mixer 164 may be increased (e.g., to perform an up-conversion operation) from the intermediate frequency, $f_{IF}$, to a carrier frequency, $f_C$, by adding the local-oscillation frequency (e.g., as shown generally in Equation 1). The RFIC 130 may receive the LO signal 160 and the IF signal 162 from the FR2 IF IC 136 or the FR2 RFIC 130.

For a receive operation, an RF current flows through the antenna and produces electromagnetic (EM) waves. Antennas produce or collect EM energy. A receive signal is received by the antenna, amplified by the LNA 82, and applied to the mixer 164 after the filter 84. The receive signal includes a carrier signal with a carrier frequency, $f_C$. The frequency of the output signal of the mixer is reduced (e.g., down-converted) relative to the carrier frequency, $f_C$, to an intermediate frequency, $f_{IF}$, by subtracting the local-oscillation frequency, $f_{LO}$ (e.g., the LO signal 160). Data is added or read from the down-converted carrier signal at the demodulator 86. In the system 120, the demodulator 86 and/or the modulator 64 may be disposed in the 5G/6G modem 138. The 5G/6G modem 138 may perform any suitable amplitude and/or frequency modulation operation. The 5G/6G modem 138 may switch between performing amplitude modulation operations and frequency modulation operations based on information received when registering a user equipment to the wireless communication network 102.

Figure 9:
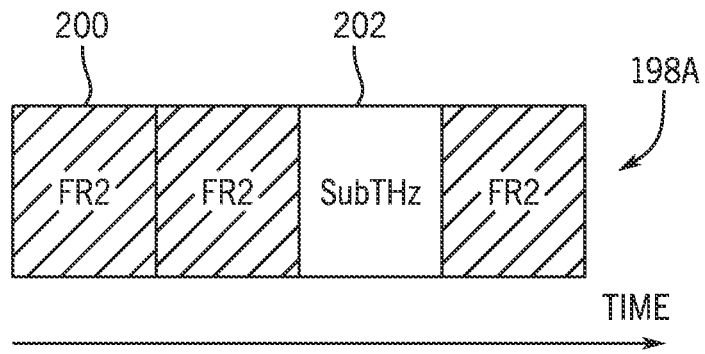
FIG. 9 is a timing diagram that illustrates a first slot pattern associated with coordinating communications of the communication systems of FIGS. 6-7, where the first slot pattern includes dedicated slots for different types of communications, according to embodiments of the present disclosure.
Figure 10:
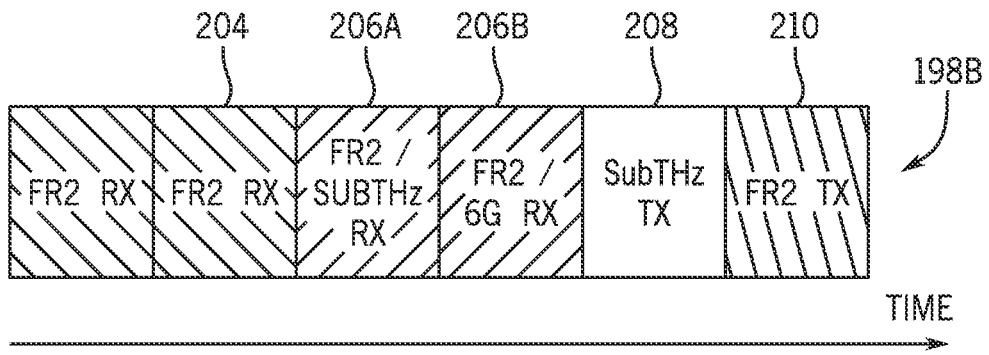
FIG. 10 is a timing diagram that illustrates a second slot pattern associated with coordinating communications of the communication systems of FIGS. 6-7, where the second slot pattern includes dedicated transmit slots for different types of communications and shared receive slots for the different types of communications, according to embodiments of the present disclosure.
Figure 11:
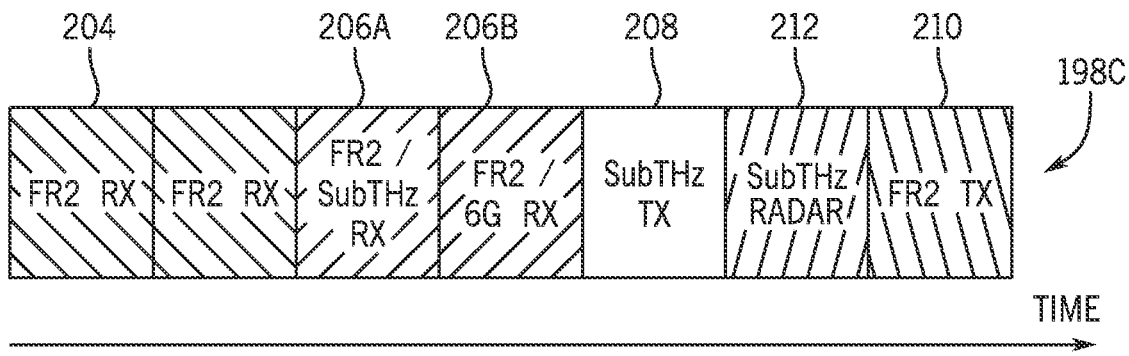
FIG. 11 is a timing diagram that illustrates a third slot pattern associated with coordinating communications of the communication systems of FIGS. 6-7, where the third slot pattern includes the second slot pattern with an additional sensing slot, according to embodiments of the present disclosure.

FIGS. 9-11 illustrate various examples of how to perform slot-level coordination between FR2 transmit and/or receive operations and SubTHz transmit and/or receive operations. Referring now to FIG. 9, FIG. 9 is a timing diagram that illustrates a first slot pattern 198A with dedicated FR2 communication slots. The first slot pattern 198A may, over time, aid integration of 5G/NR communication system operations with 6G communication system operations to reduce a likelihood of signal interference from conflicting communications. The proposed approach in FIG. 8 uses slot-level coordination between 5G FR2 communication system and the sub-THz communication system. In some embodiments, a less complex approach may be implemented by not permitting simultaneous communication between the two systems. Here, dedicated FR2 communication slots 200 are separate and non-simultaneous to dedicated sub-THz communication slots 202. It is noted that there may be some communication operations where the different front end circuits may operate based on simultaneous communication time slots, and thus the FR2 communication slots 200 and may at least partially overlapping to the sub-THz communication slots 202.

Over time, the first slot pattern 198A may repeat itself. However, as time passes, an order and/or frequency of occurrence of the repeated slots may change. In this way, the dedicated sub-THz transmission (TX) slot 208 may be scheduled to follow, for example, three or more dedicated FR2 slots 200. The FR2 RFIC 130, the FR2 IF IC 136, and/or the RFIC 126 may manage scheduling of the slots based on commands from the processor 12 and/or based on network commands received via antennas 55.

During the FR2 communication slots 200, the FR2 RFIC 130 may generate signals to enable communication (e.g., a receive operation and/or transmit operation) via the FR2 antenna panel 124 without enabling communication via the sub-THz antenna panel 122. During the sub-THz communication slots 202, the FR2 RFIC 130 and/or the RFIC 126 may generate signals to enable communication via the sub-THz antenna panel 122 without enabling communication via the FR2 antenna panel 124.

FIG. 10 is a timing diagram that illustrates a second slot pattern 198B that includes dedicated transmit slots for different types of communications and shared receive slots for the different types of communications. The proposed approach in FIG. 9 uses slot-level coordination between 5G FR2 communication system and the sub-THz communication system. In some embodiments, another approach may be to permit simultaneous receive operations to occur, but to prevent the 5G FR2 communication system and the sub-THz communication system from simultaneously transmitting. Indeed, dedicated FR2 receive (RX) slots 204, shared FR2/sub-THz RX slot 206A, shared FR2/6G RX slot 206B, dedicated sub-THz TX slots 208, and dedicated FR2 TX slots 210 are assigned different time periods (e.g., communication timing assignments) to reduce a likelihood of interference between the operations. The FR2 RFIC 130, the FR2 IF IC 136, and/or the RFIC 126 may manage scheduling of the slots based on commands from the processor 12 and/or based on network commands received via antennas 55. The shared FR2/sub-THz RX slot 206A and/or the shared FR2/6G RX slot 206B may correspond to frequency multiplexing operations since the FR2 and sub-THz communications use different frequency ranges and the FR2 and 6G communications use different frequency ranges. The shared FR2/sub-THz RX slot 206A and the shared FR2/6G RX slot 206B are time multiplexed relative to each other since the sub-THz communications and the 6G communications may partially overlap in time. In some cases, in lieu of the shared FR2/sub-THz RX slot 206A or in lieu of the shared FR2/6G RX slot 206B, the other of the slots 206 may be duplicated such that the slot pattern 198 includes back-to-back repeated shared FR2/sub-THz RX slots or shared FR2/6G RX slots.

Over time, the second slot pattern 198B may repeat itself. However, as time passes, an order and/or frequency of occurrence of the repeated slots may change. In this way, the dedicated sub-THz TX slot 208 may be scheduled to be adjacent to the dedicated FR2 RX slot 204 or in any combination relative to the other slots. Scheduling of the slots may be done based on commands from the processor 12 and/or based on network commands received via antennas 55.

During the dedicated FR2 RX slots 204, the FR2 RFIC 130 may generate signals to enable a receive operation via the FR2 antenna panel 124 without enabling a transmit operation or a receive operation at the sub-THz antenna panel 122. During the shared FR2/sub-THz RX slots 206, the FR2 RFIC 130 and/or the RFIC 126 may generate signals to enable a receive operation via the sub-THz antenna panel 122 and/or the FR2 antenna panel 124. During the dedicated sub-THz TX slots 208, the FR2 RFIC 130 and/or the RFIC 126 may generate signals to enable a transmit operation via the sub-THz antenna panel 122 without enabling a transmit operation or a receive operation at the FR2 antenna panel 124. During the dedicated FR2 TX slots 210, the FR2 RFIC 130 may generate signals to enable a transmit operation via the FR2 antenna panel 124 without enabling a transmit operation or a receive operation at the sub-THz antenna panel 122.

In yet another approach, FIG. 11 is a timing diagram that illustrates a third slot pattern 198C that includes the second slot pattern 198B with an additional sensing slot 212. The proposed approach in FIG. 11 includes the dedicated FR2 RX slots 204, the shared FR2/sub-THz RX slots 206, the dedicated sub-THz TX slot 208, and the dedicated FR2 TX slot 210 from FIG. 10 and also includes a dedicated sensing slot 212. The sensing slot 212 may be used to perform sensing operations, RF-based sensing operations (e.g., measuring distance, exchanging signals between two electronic devices to determine a distance between the devices). The dedicated FR2 RX slots 204, the shared FR2/sub-THz RX slots 206, the dedicated sub-THz TX slot 208, the dedicated FR2 TX slot 210, and the dedicated sensing slot 212 are each assigned different time periods to reduce a likelihood of interference between the operations. During the dedicated sensing slot 212, the FR2 RFIC 130 and/or the RFIC 126 may generate signals to enable a sensing operation via the sub-THz antenna panel 122 without enabling communications at the FR2 antenna panel 124.

Over time, the third slot pattern 198C may repeat itself. However, as time passes, an order and/or frequency of occurrence of the repeated slots may change. In this way, the dedicated sensing slot 212 may be scheduled adjacent to the dedicated FR2 RX slot 204, the shared FR2/sub-THz RX slot 206, or in any combination. The FR2 RFIC 130, the FR2 IF IC 136, and/or the RFIC 126 may manage scheduling of the slots based on commands from the processor 12 and/or based on network commands received via antennas 55.

Figure 12:
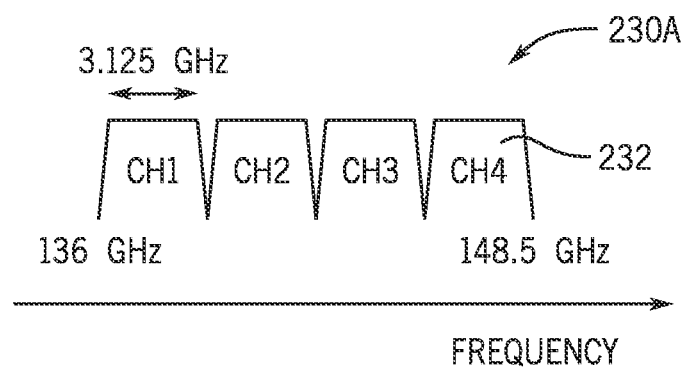
FIG. 12 is a diagram that illustrates four channels over a portion of a frequency spectrum associated with coordinating communications of the communication systems of FIGS. 6-7, according to embodiments of the present disclosure.
Figure 13:
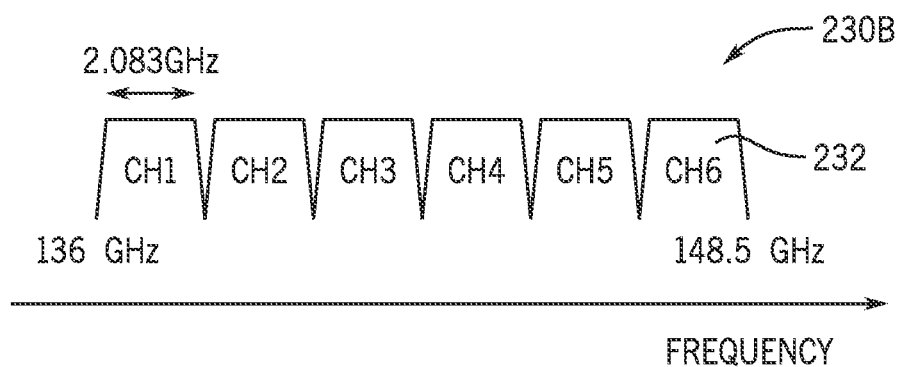
FIG. 13 is a diagram that illustrates six channels over the portion of a frequency spectrum of FIG. 12, according to embodiments of the present disclosure.

Keeping the foregoing in mind, in some cases, the available bandwidth for a sub-THz network may be as high as 12.5 GHz. When the bandwidth is this high, it may be more suitable to use 39 GHz as the intermediate frequency. Other frequencies may be suitable, such as a frequency between 20 GHz and 60 GHz, a frequency between 25 GHz and 55 GHz, a frequency between 30 GHz and 40 GHz, a frequency between 33 GHz and 35 GHz, or the like. Depending on the use case, the available bandwidth may be split into channels (where a center frequency of the channel is a channel raster) for multi-device access of the sub-THz network. An example of available bandwidth 230A being divided into four channels 232 of 3.125 GHz is shown in FIG. 12, where FIG. 12 is a diagram that illustrates channels over a portion of a frequency spectrum. An example of available bandwidth 230B being divided into 6 channels 232 of 2.08 GHz is shown in FIG. 13, where FIG. 13 is a diagram that illustrates channels over a portion of a frequency spectrum. Channels may be any suitable width, such as a frequency between 2 GHz and 4 GHz. If the sub-THz frequency spectrum is channelized, a 28 GHz frequency band may be used as the intermediate frequency, $f_{IF}$, and a 39 GHz frequency band may be used as the local oscillator, $f_{LO}$.

For a sensing operation, self-interference cancellation (SIC) may be used during simultaneous TX/RX operations. The self-interference cancellation (SIC) may be performed in the sub-THz RFIC 126 using the IF frequency on the FR2 frequency band. If sensing is performed on dedicated slots using frequency modulated carrier waveforms (FMCW), the associated FMCW sensing signal (e.g., FMCW "chirp" sensing signal) may be generated in the local oscillator, $f_{LO}$, by the sub-THz RFIC 126 at the intermediate frequency, $f_{IF}$, in FR2 frequency bands and multiplied in the sub-THz RFIC 126. In some cases, using a constant "C" equal to 3 or 4 may desirably reshape the FMCW chirp (e.g., change a pitch of the FMCW chirp from relatively low to higher, ramps frequency over time) since both slope and modulation bandwidth may increase with the multiplier. The FMCW chirp may be made using the LO signal and thus the generation operations may integrate relatively seamlessly into communication control operations represented via FIG. 10.

Figure 14:
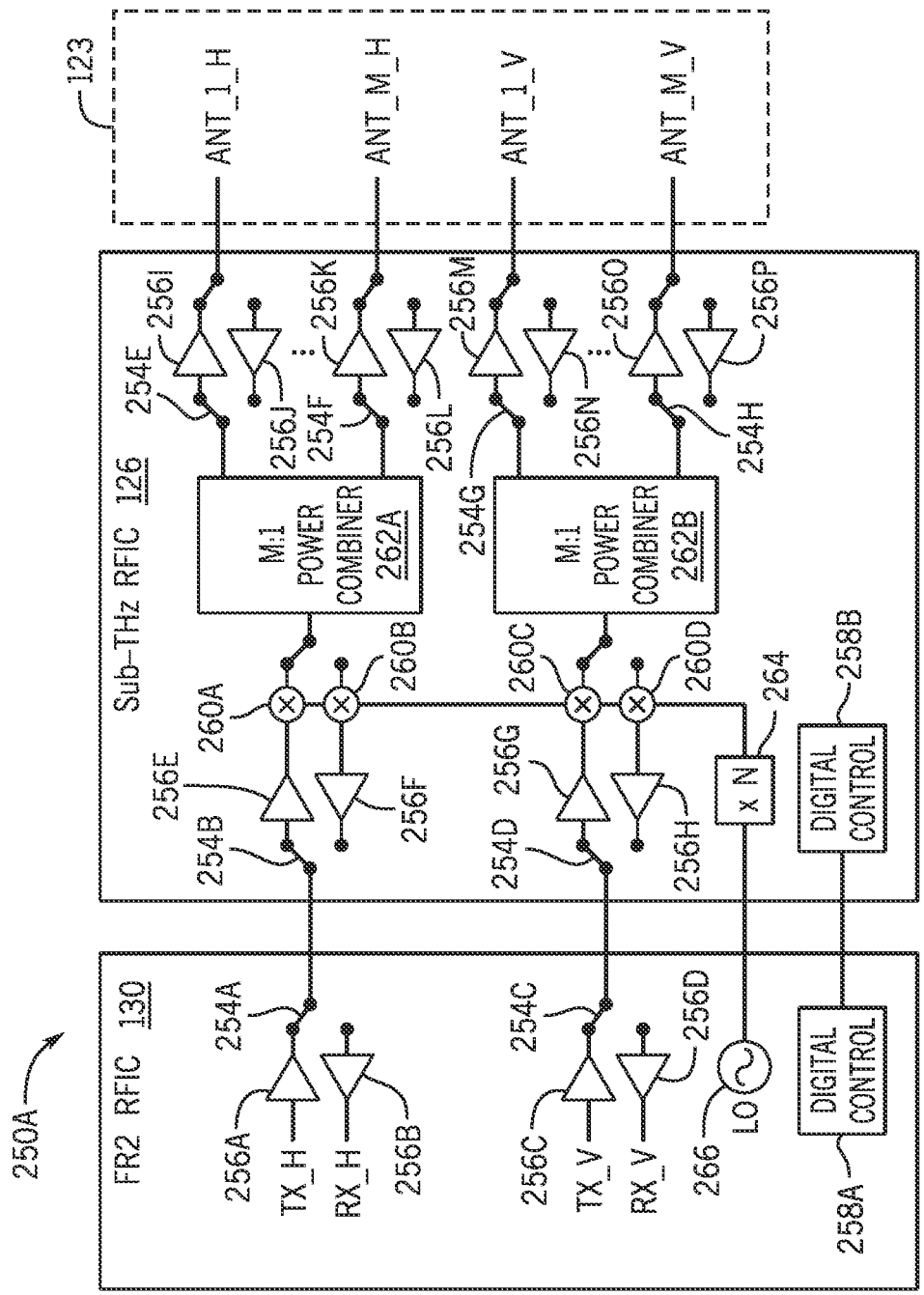
FIG. 14 is a block diagram that illustrates first example circuitry of the FR2 RFIC of FIGS. 6-7 shown without a filter (e.g., a bandpass filter), according to embodiments of the present disclosure.
Figure 15:
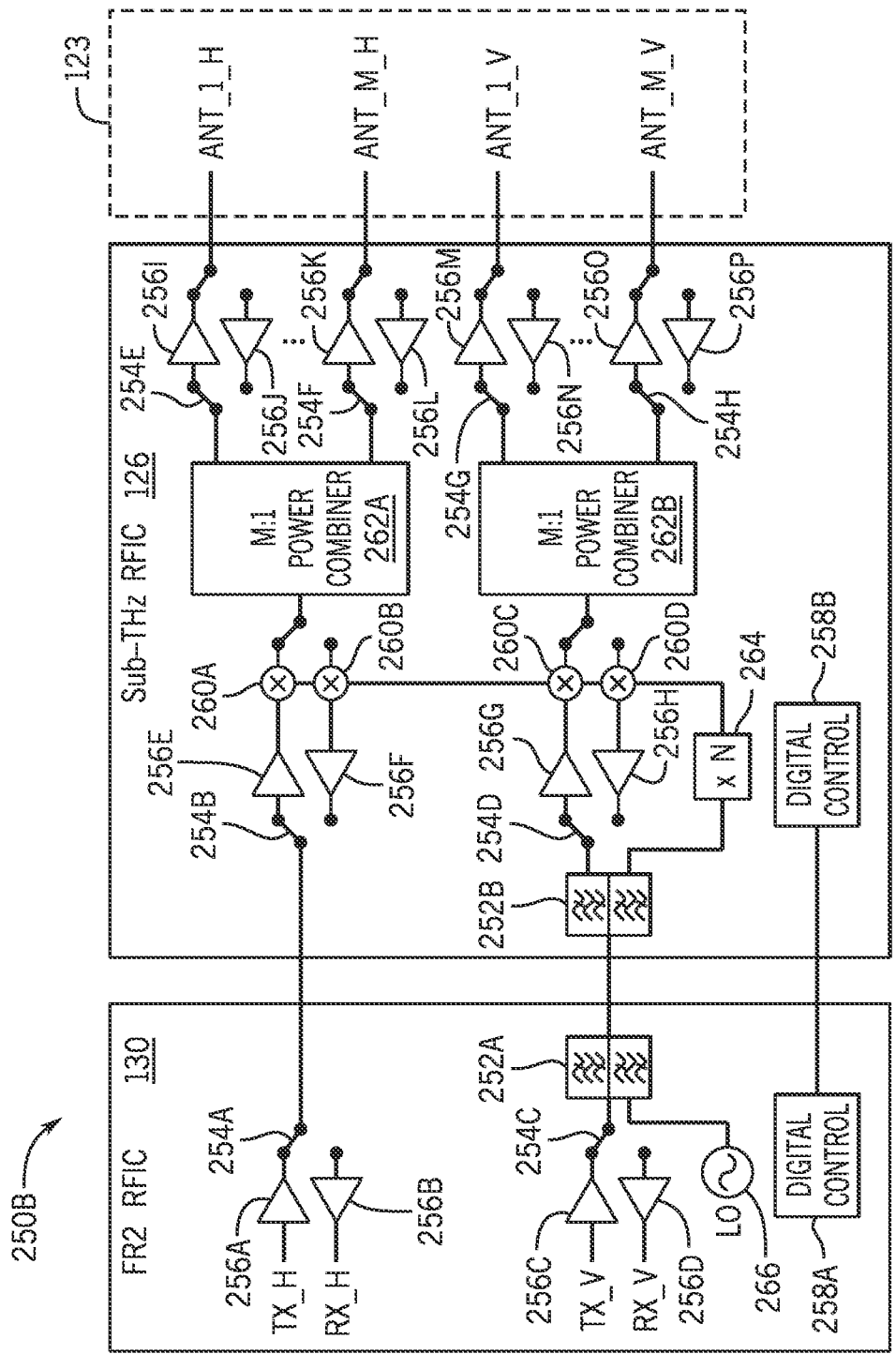
FIG. 15 is a block diagram that illustrates second example circuitry of the FR2 RFIC of FIGS. 6-7 shown with a filter (e.g., a bandpass filter), according to embodiments of the present disclosure.

Referring now to FIGS. 14-15, FIGS. 14-15 are block diagrams of example circuitry internal to the FR2 RFIC 130 and the sub-THz RFIC 126. FIG. 14 is a block diagram of a system 250A that does not include a filter and FIG. 15 is a block diagram of system 250B that includes filters 252 (first filter 252A, second filter 252B). Although the filters 252 may improve input signal and/or output signal quality, some power loss may occur as a tradeoff. Thus, which example system 250A and/or system 250B to be selected for a particular electronic device 10 may be implementation based. These example circuitries may be used in any of the examples described above (e.g., example of FIG. 6, example of FIG. 7). For ease of discussion, FIGS. 14-15 are described together herein and differences between the figures are respectively indicated.

The transmit and receive operations of the electronic device 10 may be time-multiplexed relative to each other. Some receive operations may be frequency-multiplexed (e.g., shared FR2/sub-THz RX slot 206A where FR2 communications and sub-THz receive communications may occur at least partially overlapping in time, the shared FR2/6G RX slot 206B where FR2 communications and 6G receive communications may occur at least partially overlapping in time). In this way, the sub-THz RFIC 126 may transmit signals via antennas 123 at a different time (e.g., during a different communication slot pursuant to FIGS. 9-11) than the antennas 123 receive signals. To do so, the FR2 RFIC 130 and the sub-THz RFIC 126 may include switches 254 (switch 254A, switch 254B, switch 254C, switch 254D, switch 254E, switch 254F, switch 254G, switch 254H) aid isolation of the operations.

The FR2 RFIC 130 may generate and transmit a signal for transmission via drivers 256. Indeed, the FR2 RFIC 130 and the sub-THz RFIC 126 may each include drivers 256 (driver 256A, driver 256B, driver 256C, driver 256D, driver 256E, driver 256F, driver 256G, driver 256H, driver 256I, driver 256J, driver 256K, driver 256L, driver 256M, driver 256N, driver 256O, driver 256P) to improve signal quality at various stages of processing and transmission. One or more of the drivers 256 may be used to invert an input signal to the driver 256 and/or change a magnitude of the input signal at output from the driver 256. A subset of drivers 256 at any given time may be unused for the current transmission. For example, switch 254A selectively couples to the driver 256A or to the driver 256B at different times in response to a first control signal (e.g., "1") and/or a second control signal (e.g., "0") from digital control circuitry 258 (e.g., digital control circuitry 258A, digital control circuitry 258B). In some cases, the switches 254 may default to a state that enables ongoing reception of input signals and/or a state that enables transmission by default, which may improve a speed of readiness in event of emergency communication being transmitted from the electronic device 10.

When performing a transmit operation, the digital control circuitry 258 may respectively enable the drivers 256A, 256C, 256E, 256G, 256I, 256K, 256M, and 256O via the respectively corresponding switches 254 and enable transmission of one or more output signals via the antenna 123. To transmit, the one or more output signals may be transmitted via mixer circuitry 260 (mixer 260A, mixer 260B, mixer 260C, mixer 260D). The LO signal (generated by signal generator 266) may processed by a multiplier 264 before being sent to the mixer 260D. The LO signal may be an analog signal. The multiplier 264 may correspond to constant "C" in Equation 1. Should "Y" have a value other than "1" or unity, then an additional multiplier may be coupled to an output from the filter 252B corresponding to the switch 254D. Some of the drivers 256 may receive horizontally polarized transmit signals ("H") (e.g., driver 256A, 256E, 256I, 256K) and some of the drivers 256 may receive vertically polarized transmit signals ("V") (e.g., driver 256C, 256G, 256M, 256O). Before being transmitted via the antennas 123, processed output signals may undergo additional power combining at M:1 power combiners 262 (power combiner 262A, power combiner 262B). The power combiners 262 may combine multiple output signals into one output signal suitable for subsequent transmission via antennas 123. Additionally or alternatively, in the case of FIG. 15, before being transmitted to the mixer 260C, the output signal undergoes filtering via the filters 252. In this example, the filters 252 are shown as bandpass filters. However, any suitable filtering circuitry may be used, such as a high pass filter, a low pass filter, a band reject filter, or the like. Here, the output signal may be processed such that the desired frequency range of signals (e.g., sub-THz frequency range for transmit operation) are transmitted onto the mixer circuitry 260. When the output signal is converted into a sub-THz frequency signal at the mixer circuitry 260, the frequency range allowed to pass by both the filters 252 may be the FR2 frequency range used by the FR2 RFIC 130.

When performing a receive operation, the digital control circuitry 258 may respectively enable the drivers 256B, 256D, 256F, 256H, 256J, 256L, 256N, and 256P via the respectively corresponding switches 254 and enable reception of one or more input signals via the antenna 123. To receive, the one or more input signals may be received via the mixer circuitry 260. The LO signal may be processed based on the multiplier 264 after being sent from the mixer 260D. The multiplier 264 may correspond to constant "C" in Equation 1. Should "Y" have a value other than "1" or unity, then an additional multiplier may be coupled to an input from the filter 252B corresponding to the switch 254D. Indeed, the multiplier 264 may define a constant (e.g., "C") to reference when deriving the LO signal from the input signal, and thus the LO signal may be generated in a receive operation based on the multiplier 264 and the input signal output. Some of the drivers 256 may receive horizontally polarized receive signals ("H") (e.g., driver 256B, 256F, 256J, 256L) and some of the drivers 256 may receive vertically polarized receive signals ("V") (e.g., driver 256D, 256H, 256N, 256P). After being received via the antennas 123, input signals may undergo additional power combining at M:1 power combiners 262 (power combiner 262A, power combiner 262B) and processing via drivers 256J, 256L, 256N, and 256P, which may increase a magnitude of the input signal and/or process the input signal to have characteristics able to processed by downstream circuitry of the FR2 RFIC 130 and the sub-THz RFIC 126. The power combiners 262 may split one input signal into multiple input signals suitable for subsequent downstream processing. Similar to the transmit operation, in the case of FIG. 15, before being transmitted to the driver 256D, the input signal undergoes filtering via the filters 252. When the input signal is converted into a FR2 frequency signal at the mixer circuitry 260, the frequency range allowed to pass by both the filters 252 may be the FR2 frequency range used by the FR2 RFIC 130.

Figure 16:
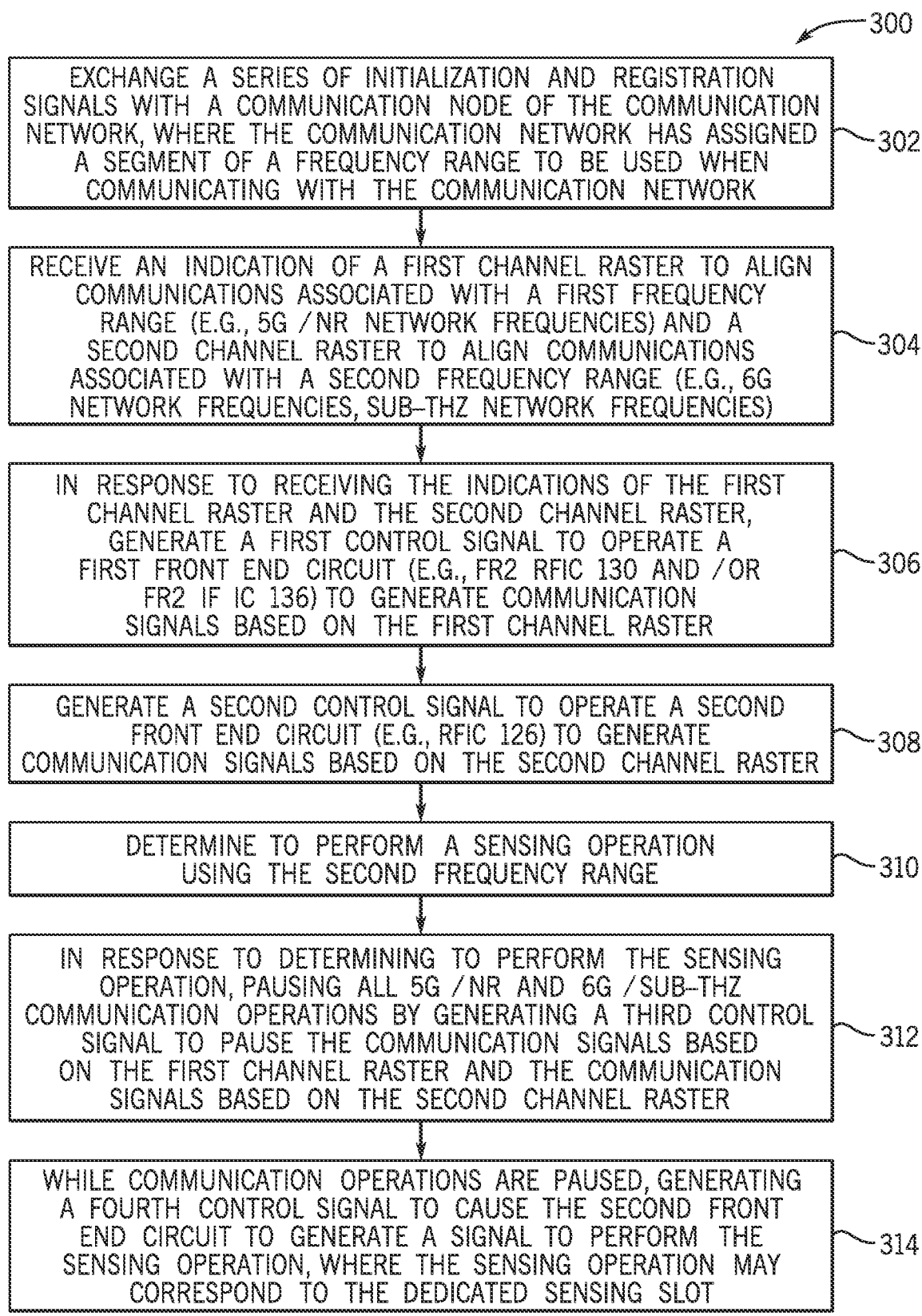
FIG. 16 is a flowchart of a method that describes how an example user equipment may register to a network and receive an indication of different channel rasters to use when communicating on different radio frequency networks (e.g., cellular networks, a 5G/NR network v. a sub-THz network), according to embodiments of the present disclosure.

Keeping the foregoing in mind, FIG. 16 is a flowchart of a method 300 that describes how an example user equipment may register to a network and receive an indication of different channel rasters to use when communicating on different radio frequency networks (e.g., cellular networks, a 5G/NR network v. a sub-THz network) according to systems and methods described above with reference to FIGS. 1-15. Any suitable device (e.g., a controller) that may control components of the electronic device 10, such as the processor 12, may perform the method. In some embodiments, the method 300 may be implemented by executing instructions stored in a tangible, non-transitory, computer-readable medium, such as the memory 14 or storage 16, using the processor 12. For example, the method 300 may be performed at least in part by one or more software components, such as an operating system of the electronic device 10, one or more software applications of the electronic device 10, and the like. While the method 300 is described using steps in a specific sequence, it should be understood that the present disclosure contemplates that the described steps may be performed in different sequences than the sequence illustrated, and certain described steps may be skipped or not performed altogether.

The processor 12 may register to a communication network using at least some operations of the method 300. To do so, at block 302, the processor 12 may exchange a series of initialization and registration signals with a communication node of the communication network. As part of the registration process, the processor 12 may be assigned a segment of a frequency range to use when communicating with the communication network. For example, the processor 12 may receive, at block 304, an indication of a first channel raster to align communications associated with a first frequency range (e.g., 5G/NR network frequencies) and a second channel raster to align communications associated with a second frequency range (e.g., 6G network frequencies, sub-THz network frequencies). The processor 12 may, at block 306, in response to receiving the indications of the first channel raster and the second channel raster, generate a first control signal to operate a first front end circuit (e.g., FR2 RFIC 130 and/or FR2 IF IC 136) to generate communication signals based on the first channel raster. The processor 12 may, at block 308, generate a second control signal to operate a second front end circuit (e.g., RFIC 126) to generate communication signals based on the second channel raster. In some cases, the second front end circuit may generate the communication signals based on the first front end circuit (e.g., RFIC 126 may operate based on FR2 IF IC 136 and/or FR2 RFIC 130). The processor 12 may, at block 310, determine to perform a sensing operation using the second frequency range. In response to determining to perform the sensing operation, the processor 12 may, at block 312, pause all 5G/NR and 6G/sub-THz communication operations. To do so, the processor 12 may generate a third control signal to pause the communication signals based on the first channel raster and the communication signals based on the second channel raster. Then, while paused, at block 314, the processor 12 may generate a fourth control signal to cause the second front end circuit to generate a signal to perform the sensing operation. The sensing operation may correspond to the dedicated sensing slot 212.

Figure 17:
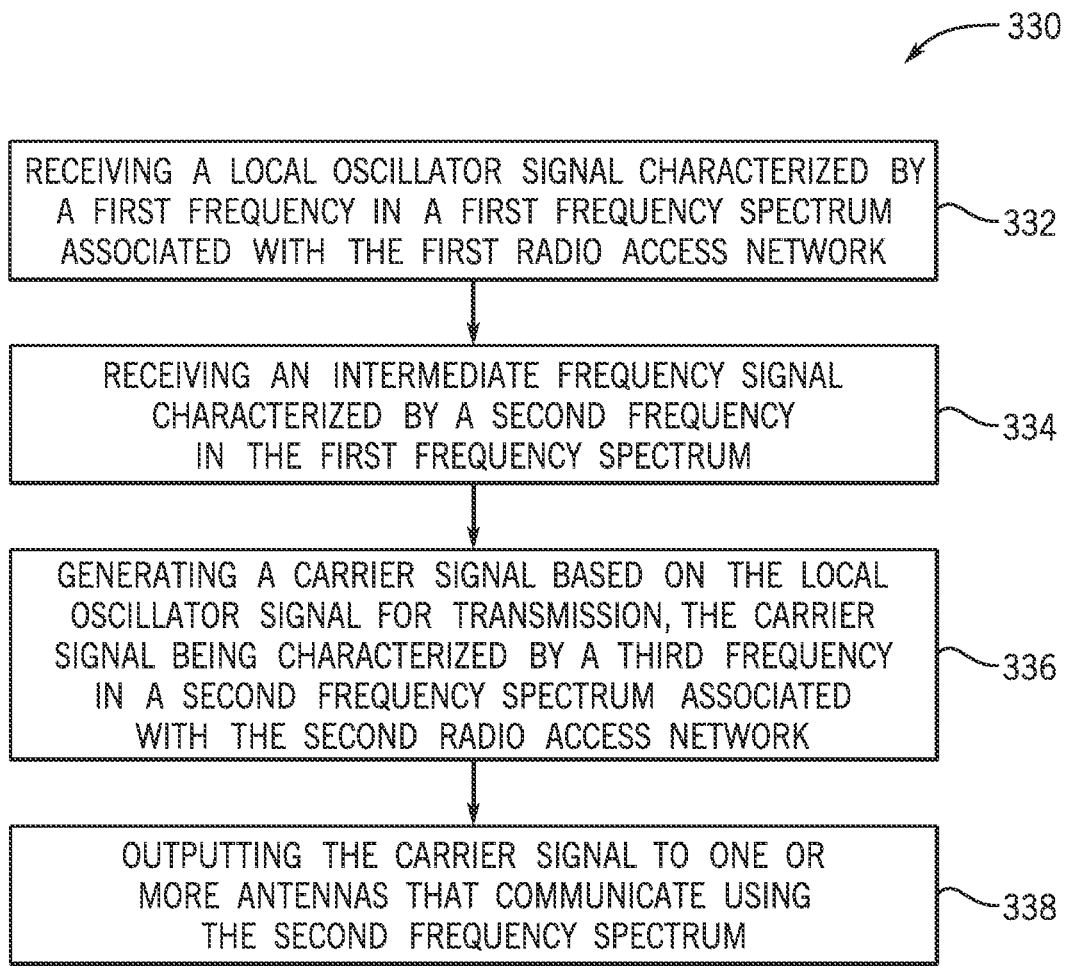
FIG. 17 is a flowchart of a method that describes how an example user equipment may communicate on different radio frequency networks (e.g., cellular networks, a 5G/NR network v. a sub-THz network), according to embodiments of the present disclosure.

Keeping the foregoing in mind, FIG. 17 is a flowchart of a method 330 that describes how an example user equipment may communicate on different radio frequency networks (e.g., cellular networks, a 5G/NR network v. a sub-THz network) according to systems and methods described above with reference to FIGS. 1-15. Any suitable device (e.g., a controller) that may control components of the electronic device 10, such as the processor 12, may perform the method 330, for example, the RFIC 126. In some embodiments the method 330 may be implemented by executing instructions stored in a tangible, non-transitory, computer-readable medium, such as the memory 14 or storage 16, using the processor 12. For example, the method 330 may be performed at least in part by one or more software components, such as an operating system of the electronic device 10, one or more software applications of the electronic device 10, and the like. While the method 330 is described using steps in a specific sequence, it should be understood that the present disclosure contemplates that the described steps may be performed in different sequences than the sequence illustrated, and certain described steps may be skipped or not performed altogether.

At block 332, the RFIC 126 may receive a LO signal characterized by a first frequency in a first frequency spectrum associated with the first radio access network. At block 334, the RFIC 126 may receive an IF signal characterized by a second frequency in the first frequency spectrum. At block 336, the RFIC 126 may generate a carrier signal based on the LO signal for transmission via a second radio access network having different network characteristics that the first radio access network. In some cases, the carrier signal is characterized by a third frequency in a second frequency spectrum associated with the second radio access network. At block 338, the RFIC 126 may output the carrier signal to one or more antennas that communicate using the second frequency spectrum.

Keeping the foregoing in mind, systems and methods described herein may include a sub-THz integrated circuit and antenna system that may interface with both 6G/sub-THz spectrums and 5G/NR spectrums. Quality of these communications may further improve with suitable communication coordination between timing slots allocated for respective 6G/sub-THz receive operations, 6G/sub-THz transmit operations, 6G/sub-THz sensing operations, 5G/NR receive operations, and 5G/NR transmit operations, or a combination thereof. By using the systems and methods described herein, some existing circuitry designs, such as MLB traces, silicon molds and manufacturing processes, flex cables, and the like, may be reused and applied to 6G/sub-THz-enabled systems. In this way, both the second front end circuit and the first front end circuit may operate based on signals received via the shared flex cable(s). This reuse may reduce costs and complexity of bringing this new technology to market. Furthermore, sharing these systems with 5G/NR operations and 6G/sub-THz operations may be relatively less complex than other 6G/sub-THz solutions in development with a smaller footprint, where having a small footprint is a relatively large advantage in the portable electronic technical market.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. An electronic device, comprising:
a first front end circuit configured to use a first frequency spectrum based on a first slot indication associated with resuming communication using the first frequency spectrum;
a first antenna panel coupled to the first front end circuit;
a second front end circuit configured to use a second frequency spectrum higher than the first frequency spectrum based on a second slot indication associated with resuming communication using the second frequency spectrum and pausing communication using the first frequency spectrum, the second front end circuit being coupled to the first front end circuit; and
a second antenna panel coupled to the second front end circuit.

2. The electronic device of claim 1, wherein the second front end circuit is configured to communicate on the second frequency spectrum higher than the first frequency spectrum based on a local oscillator signal and an intermediate frequency signal received from the first front end circuit.

3. The electronic device of claim 2, wherein the local oscillator signal and the intermediate frequency signal are characterized by different frequency values both within the first frequency spectrum.

4. The electronic device of claim 1, wherein the second front end circuit comprises an amplifier, a mixer, and a modulator.

5. The electronic device of claim 1, wherein the second front end circuit and the first front end circuit operate based on a signal received via a flex cable.

6. The electronic device of claim 1, wherein the second front end circuit and the first front end circuit are configured to operate based on non-simultaneous communication time slots.

7. The electronic device of claim 1, wherein the second front end circuit and the first front end circuit are configured to operate based on simultaneous communication time slots.

8. The electronic device of claim 1, wherein the second frequency spectrum corresponds to frequencies between 130 gigahertz (GHz) and 150 GHz, and the first frequency spectrum corresponds to frequencies between 24 GHz and 48 GHz.

9. A radio frequency communication system, comprising:
a first integrated circuit associated with a first frequency spectrum;
an antenna; and
a second integrated circuit associated with a second frequency spectrum, the second integrated circuit being coupled to the antenna, and the second integrated circuit being configured to
receive a local oscillator signal characterized by a first frequency in the first frequency spectrum from the first integrated circuit,
receive an intermediate frequency signal characterized by a second frequency in the first frequency spectrum from the first integrated circuit,
receive a slot indication associated with resuming communication using the second frequency spectrum and pausing communication using the first frequency spectrum, and
generate a carrier signal based on the local oscillator signal and the intermediate frequency signal for transmission via the antenna and based on the slot indication, the carrier signal being characterized by a third frequency in the second frequency spectrum.

10. The radio frequency communication system of claim 9, wherein the first frequency and the second frequency are characterized by different frequency values between 24 gigahertz (GHz) and 48 GHz.

11. The radio frequency communication system of claim 9, wherein the first frequency spectrum corresponds to wireless communications associated with a first radio network, and the second frequency spectrum corresponds to wireless communications associated with a second radio network.

12. The radio frequency communication system of claim 9, wherein the second integrated circuit comprises a mixer that receives the local oscillator signal and the intermediate frequency signal and that generates the carrier signal.

13. The radio frequency communication system of claim 9, wherein the first integrated circuit comprises a first plurality of drivers, the second integrated circuit comprises a second plurality of drivers, and the intermediate frequency signal and the local oscillator signal are transmitted to the second integrated circuit by the first integrated circuit via the first plurality of drivers and the second plurality of drivers.

14. The radio frequency communication system of claim 13, wherein the first integrated circuit comprises a first bandpass filter, the second integrated circuit comprises a second bandpass filter, and the first bandpass filter is configured to couple to a subset of the first plurality of drivers and the second bandpass filter.

15. A method of operating user equipment to communicate via a first radio access network and a second radio access network, comprising:
receiving, via a radio frequency integrated circuit, a local oscillator signal characterized by a first frequency in a first frequency spectrum associated with the first radio access network;
receiving, via the radio frequency integrated circuit, an intermediate frequency signal characterized by a second frequency in the first frequency spectrum;
receiving, via the radio frequency integrated circuit, a slot indication associated with resuming communication using a second frequency spectrum associated with the second radio access network and pausing communication using the first frequency spectrum,
generating, via the radio frequency integrated circuit, a carrier signal based on the local oscillator signal for transmission and based on the slot indication, the carrier signal being characterized by a third frequency in the second frequency spectrum; and
outputting, via the radio frequency integrated circuit, the carrier signal to one or more antennas configured to communicate using the second frequency spectrum based on the slot indication.

16. The method of claim 15, comprising:
receiving, via the radio frequency integrated circuit, an additional slot indication associated with pausing communication using the second frequency spectrum and resuming communication using the first frequency spectrum; and
pausing, via the radio frequency integrated circuit, carrier signal generation operations based on the additional slot indication.

17. The method of claim 15, wherein the slot indication is associated with a receive operation based on the second frequency spectrum.

18. The method of claim 15, wherein the slot indication is associated with a transmit operation based on the second radio access network.

19. The method of claim 15, wherein the slot indication is associated with non-simultaneous communications of the first radio access network and of the second radio access network.

20. The method of claim 15, comprising:
generating, via the radio frequency integrated circuit, a frequency modulated carrier waveform based on the local oscillator signal for transmission, the frequency modulated carrier waveform being characterized by a fourth frequency in the second frequency spectrum associated with the second radio access network; and
outputting, via the radio frequency integrated circuit, the frequency modulated carrier waveform during a dedicated sensing time after outputting the carrier signal.

* * * * *